United States Patent [19]
Peters

[11] 3,746,778
[45] July 17, 1973

[54] LIMITED VISIBILITY SIMULATION FOR A VEHICLE TRAINER VISUAL SYSTEM
[75] Inventor: David L. Peters, Whitney Point, N.Y.
[73] Assignee: The Singer Company, Binghamton, N.Y.
[22] Filed: Oct. 26, 1971
[21] Appl. No.: 192,531

[52] U.S. Cl. .................. 178/5.2 R, 178/DIG. 35
[51] Int. Cl. ............................................. H04n 9/02
[58] Field of Search............. 178/5.2, 5.4, DIG. 6, 178/DIG. 35

[56] References Cited
UNITED STATES PATENTS
3,517,122   6/1970   Owen.......................... 178/DIG. 35
3,595,987   7/1971   Vlahos........................... 178/5.2 R Primary Examiner—Richard Murray
Attorney—Francis L. Masselle

[57] ABSTRACT

Apparatus is provided to prevent the top portions of vertical objects, displayed on a scanned raster display being used to present a visual scene to an observer in a vehicle trainer and having its fast sweep in the vertical direction, from being obscured when a limited visibility function is used to modify the display in which on a line by line basis the objects are detected and the value of the visibility function held fixed until scanning of the object is completed at which time the normal function is resumed.

7 Claims, 3 Drawing Figures

LIMITED VISIBILITY SIMULATION FOR A VEHICLE TRAINER VISUAL SYSTEM

The Invention herein described was made in the course of or under a contract, or subcontract thereunder, with The Department of the Navy.

This invention relates to simulation in general and more particularly to an improved system for limited visibility simulation in a vehicle trainer visual system.

Simulators for training operators of aircraft, ship, boats, trains, etc. have gained widespread use because of their ability to accomplish training at a lower cost and to provide types of emergency training which may not safely be done in the actual vehicle. To get the most benefit from simulators, many are provided with visual systems providing visual cues to aid in training. Commonly in aircraft and water vehicle simulation particularly, visual simulation of fog and haze is provided which may be controlled to obscure part of the view.

One problem with the systems previously used to provide this simulation is that fog or haze is normally made a function of distance from the observer to a point on a flat earth commonly referred to as slant range. Thus, the tops of close objects which should be visible may be obscured. This is a particular problem in training operators of small boats and amphibious vehicles where navigation around objects in the water is an important part of the training.

The present invention solves this problem by providing means to sense objects in the water and to control the visibility function accordingly.

It is the principal object of this invention to provide a fog simulation system which will take into account vertical objects close to an observer.

It is also an object to provide such a system useful in an amphibious assault vehicle simulator.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which.

Figure 1:
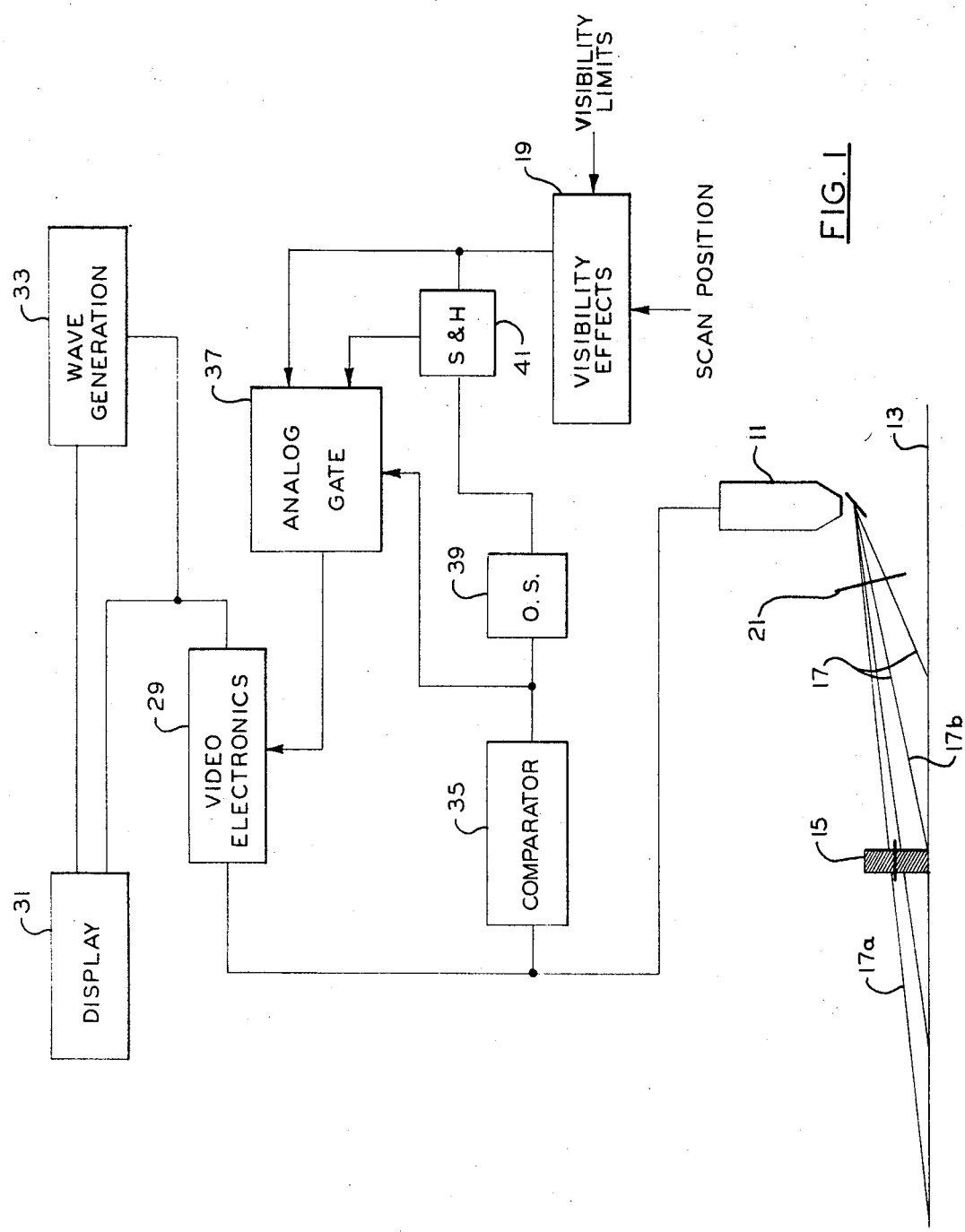
FIG. 1 is a block diagram of a preferred embodiment of the invention.

FIG. 1 illustrates, in block diagram form, a preferred embodiment of the invention useful in the visual system of an assault vehicle simulator. Such a visual system is described in U.S. application Ser. No. 192,532 filed on even date herewith by A. P. Collier and assigned to the same assignee as the present invention. A probe 11 containing optical elements and a color television camera views a model 13 containing cultural features of the sea scape. Wave simulation is accomplished by other portions of the system in the above referenced application. The portions of the model containing no land or other detail such as bouy 15 will be painted black with some one color such as blue added to simulate depth. Details such as bouy 15 will be their normal color.

Lines 17 indicate various slant range distances to points on the model. A visibility effects generator 19 willl generate a fog function which is determined by the visibility limits selected by the instructor and the vertical scan position which is directly related to the length of lines 17. A system which may be used to generate the function is described in U. S. Pat. No. 3,524,019 granted to R. T. Coen on Aug. 11, 1970. Other methods of electronic fog simulation well known in the art may also be used. If line 17a is selected as the range where all detail is obscured by fog, the result on bouy 15 can be seen by assuming a display plane 21 such as a CRT screen near probe 11. Everything on plane 21 above line 17a will be obscured including the top portion of bouy 15 which should be visible.

Figure 2:
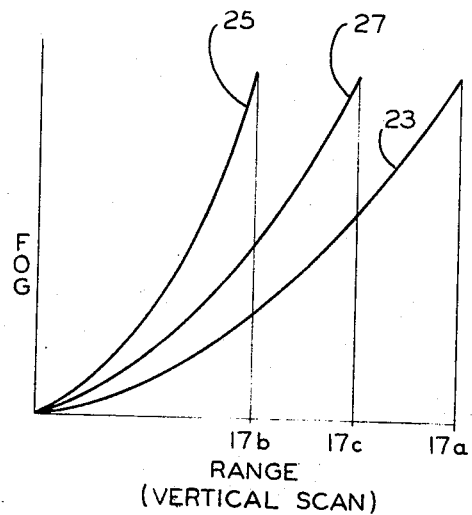
FIG. 2 illustrates normal fog function curves.

FIG. 2 shows a typical fog function 23. As range increases, the amount of fog is increased. As shown at a range of 17a corresponding to line 17a on FIG. 1 the fog is almost maximum and will obscure most of the scene. That is, range 17a is the visibility limit. But at 17b on curve 23, which is the range to bouy 15 of FIG. 1, only a small amount of fog is present and the bouy should be visible. Since range as viewed on a display plane such as 21 of FIG. 1 will be a function of vertical scan, the ordinate of the function may be relabeled as vertical scan. That is the amount of fog will increase as the scan moves to the top of the screen. The system in which this invention is used must have its fast scan in the vertical direction as will become obvious below. Curves 25 and 27 show fog functions for visibility range limits 17b and 17c.

As described above, sea areas of model 13 of FIG. 1 are black with one color added. The camera in probe 11 views the scene and, after processing in video electronics 29, the resulting video is displayed on display 31. Wave scenes are provided by block 33 described in the above referenced application. Since the model contains only one color in the sea areas for example blue, one of the other two video signals (red or green) may be taken from the camera in probe 11 to a comparator 35. This will be a high frequency analog comparator. As long as only sea is being scanned, the signal to comparator 35 will be near zero. But if an object such as bouy 15 is encountered, a signal on the red and/or green video channel will result. This will cause comparator 35 to provide a DC output.

A visibility function such as that shown on FIG. 2 is being generated in block 19 and up to this point has been switched through an analog gate 37 to video electronics 29 where it has been used to modify the displayed scene to simulate limited visibility. When the signal from comparator 35 occurs, two things happen. A one shot multivibrator 39 is triggered, and analog gate 37 is switched to an input from a sample and hold circuit 41. The output from one shot 39 is a short pulse provided to the sample command input of sample and hold 41, which is sampling the output of block 19. When the output from one shot occurs sample and hold 41 will hold the input being sampled at that time and provide it as an output to gate 37. Gate 37 has been switched to this input and will provide the input from sample and hold 41 as its output.

Figure 3:
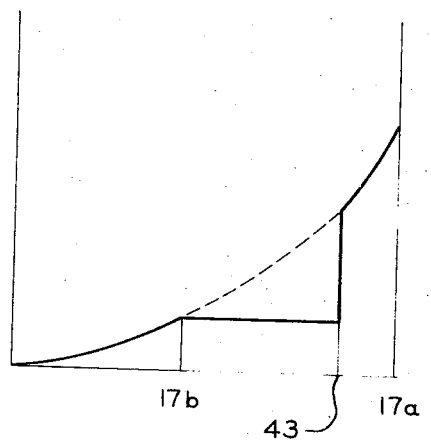
FIG. 3 illustrates a fog function curve modified by the embodiment of FIG. 1.

The result is shown on FIG. 3. The fog function provided to block 29 of FIG. 1 increases normally to point 17b. At that point, the bouy is sensed and the circuit explained above causes the value to hold constant. When the top of the bouy is reached, the output of comparator 35 will go to zero and gate 37 will switch back to the normal input. This occurs at point 43 on FIG. 3 at which point the normal fog function is resumed. This procedure will occur for each of the vertical scan lines thus allowing the system to be effective for objects as narrow as one TV line.

In this way, the whole bouy will be visible as it should be. Thus a system in which objects having vertical height are sensed and fog function varied to keep them from being improperly obscured has been shown. It will be obvious to those skilled in the art that various modifications to the system and other applications of the system may be made without departing from the basic principles of the invention which is intended to be limited solely by the appended claims.

I claim:

1. In a visual display system of the scanned raster type having its fast sweep in the vertical direction wherein there is displayed to an observer a simulated real world scene as viewed from a predetermined vantage point and wherein said scene comprises a view of an essentially flat plane having vertical objects projecting from it and further including means for generating a limited visibility function to be used to obscure portions of the scene, apparatus to prevent objects in the foreground from being improperly obscured comprising;
   a. means to detect on a vertical line by line basis the presence of a projecting object and to provide an output indicative thereof for as long as said line is displaying said object; and
   b. means responsive to said output to hold the visibility function constant, at the value it had when said output first appeared, for as long as said output is present.

2. The invention according to claim 1 wherein said responsive means comprise:
   a. an analog gate responsive to said detector output and having two inputs one of which is connected to the visibility function and providing an output to said display; and
   b. a sample and hold circuit having its sample input connected to said visibility function, its output connected to the second input of said gate and having its sampling command input being responsive to the leading edge of said detector output.

3. The invention according to claim 2 and further including:
   a. one shot multivibrator between said detector output and said sample command input whereby a short sampling pulse will be provided to said sample and hold circuit.

4. The invention according to claim 1 wherein said display is a color display and said display scene is generated by a scanned raster device scanning a stored representation of said scene and providing red, green and blue video signals, the flat plane areas on said stored scene being essentially black with no more than one of the three colors added with said objects in their normal color and said means to detect said object comprises means to detect a video level of a predetermined value above zero on one of the color video signals other than the one corresponding to said added color.

5. The invention according to claim 4 wherein said means to detect comprises a comparator connected to said one of the other video signals and arranged to provide an output when said video level reaches said predetermined value above zero.

6. The invention according to claim 4 wherein said stored representation is a scale model with its flat areas essentially black and containing thereon said objects in proper color and said scanned raster device to generate said scene comprises a color television camera mounted in an optical probe.

7. The invention according to claim 6 wherein said essentially black flat areas represent water and further including means associated with said display to electronically generate wave scenes on the portions of said display which would otherwise be essentially black.

* * * * *